United States Patent [19]

Buxbaum et al.

[11] 4,342,678
[45] Aug. 3, 1982

[54] GLASS-REINFORCED POLYESTER MOULDING COMPOUNDS

[75] Inventors: Lothar Buxbaum, Lindenfels; Franz Breitenfellner, Bensheim, both of Fed. Rep. of Germany

[73] Assignee: Ciba-Geigy Corporation, Ardsley, N.Y.

[21] Appl. No.: 167,179

[22] Filed: Jul. 9, 1980

[30] Foreign Application Priority Data

Jul. 17, 1979 [CH] Switzerland ................... 6631/79

[51] Int. Cl.³ ..................... C08K 7/14; C08L 67/02
[52] U.S. Cl. ..................... 524/539; 524/604; 524/371
[58] Field of Search ..................... 260/40 R

[56] References Cited

U.S. PATENT DOCUMENTS

| | | | |
|---|---|---|---|
| 3,091,600 | 5/1963 | Caldwell et al. | 528/302 |
| 3,390,132 | 6/1968 | Walker | 528/302 |
| 3,391,056 | 7/1968 | Robinson | 428/260 |
| 3,516,957 | 6/1970 | Gray et al. | 260/22 |
| 3,723,568 | 3/1973 | Hoeschele | 260/40 R |
| 3,723,569 | 3/1973 | Hoeschele | 260/40 R |
| 4,048,135 | 10/1977 | Wurmb et al. | 260/40 R |
| 4,075,180 | 2/1978 | Davis et al. | 528/302 |

FOREIGN PATENT DOCUMENTS 1221323 7/1966 Fed. Rep. of Germany .

OTHER PUBLICATIONS

Batzer, H. and Fritz, G., *Makromoleculare Chemie*, vol. 11, 8/10/53, "Polyester aus cycloaliphatischen verbindungen", pp. 85–86.

Batzer, H. and Weissenberger, G., ibid., vol. 11, 7/25/53, "Eigenschaften der Polyester der Acetylendicarbonsäure", pp. 83–84.

Batzer, H. and Fritz, G., ibid., vol. 14, 10/12/54, "Ober hydroaromatische Polyester, ein experimenteller Beitrag ...", p. 179.

*Primary Examiner*—Paul Lieberman
*Assistant Examiner*—Robert E. L. Sellers
*Attorney, Agent, or Firm*—Luther A. R. Hall

[57] ABSTRACT

The invention relates to glass-reinforced polyester moulding compounds which contain a polyester that is at least 90 mol. % a polyester of 1,4-butanediol and trans-1,4-cyclohexanedicarboxylic acid or polyester forming derivatives thereof. The content of glass fibres is preferably 2 to 60% by weight, based on the moulding compound. The moulding compounds of the invention have improved tracking resistance.

3 Claims, No Drawings

GLASS-REINFORCED POLYESTER MOULDING COMPOUNDS

Glass-reinforced thermoplastic moulding compounds, especially those based on polyamides and polyesters, are currently known in the art. Regarding glass-reinforced polyesters, attention is drawn in particular to German Offenlegungsschrift No. 1 921 010, which discloses inter alia glass-reinforced polyesters based on polyethylene terephthalate (PETP), poly-1,4-butylene terephthalate (PBTP) and poly-1,4-cyclohexanedimethylene terephthalate.

The addition of glass fibres to thermoplastic polyesters improves a number of mechanical and physical properties, e.g. tensile strength, E-module and dimensional stability under heat. There is, however, a marked decrease in toughness, elongation, and tracking resistance. Deterioration in tracking resistance is an especially serious drawback of the glass-reinforced thermoplastic moulding compounds of the prior art, because these latter are often used in the electrical industry.

Accordingly, it is the object of the present invention to provide glass-reinforced thermoplastic moulding compounds which, in addition to having satisfactory tensile properties and good thermal properties, have good tracking resistance, especially when tested by the KB method of DIN 53 480. These moulding compounds are also intended to have at the same time good toughness properties.

The invention relates to glass-reinforced thermoplastic polyester moulding compounds containing a polyester which is at least 90 mol. % a polyester of 1,4-butanediol and trans-1,4-cyclohexanedicarboxylic acid or polyester forming derivatives thereof.

Preferred moulding compounds are those which contain 40 to 90% by weight, preferably 60 to 90% by weight, based on the moulding compositions, of a polyester obtained from trans-1,4-cyclohexanedicarboxylic acid or polyester forming derivatives thereof, and 1,4-butanediol, and 2 to 60% by weight, preferably 10 to 40% by weight, of glass fibres, based on the moulding compound.

In addition to containing the glass fibres, the moulding compounds of this invention can also contain other customary fillers and additives, e.g. dyes, inorganic and organic pigments, fluorescent whitening agents, dulling agents, mould release agents and lubricants, stabilisers, antioxidants, crystallisation promoters and flame retardants. Preferred moulding compounds in this connection are those which contain flame retardants in a concentration of 5 to 25% by weight, based on the moulding compound.

Suitable flame retardants are halogen-containing organic compounds which can be used by themselves or together with compounds of the elements of the 5th main group of the Periodic Table, especially phosphorus compounds and antimony trioxide. Examples of flame retardants are: tetrafluoro- and tetrabromophthalic anhydride, tetra- or decabromodiphenyl ether, hexachlorobiphenyl, decabromobiphenyl, N,N'-ethylene-bis-tetrabromophthalimide and, in particular, brominated polystyrene. Preferred flame retardants are antimony trioxide and decabromodiphenyl ether.

The trans-1,4-cyclohexanedicarboxylic acid and also the polyesters employed in the practice of this invention have been known for some time. Attention is drawn in this connection to the publications of H. Batzer and G. Fritz in Makromolekulare Chem., 11, (1953) and 14, (1954), 179–232.

The presence of a polyester which is at least 90 mol. % a polyester of 1,4-butanediol and trans-1,4-cyclohexanedicarboxylic acid or polyester forming derivatives thereof, results in a good crystallisability of the final product. The concurrent use of at most 10 mol. % of other dicarboxylic acids (or diols) in the production of the polyesters to be used in the practice of the invention, does not impair, or only significantly impairs, this good crystallisability.

Examples of suitable dicarboxylic acids are: azelaic acid, sebacic acid, succinic acid, dodecanedicarboxylic acid, cis-1,4-cyclohexanedicarboxylic acid, terephthalic acid, isophthalic acid.

Examples of suitable diols are: ethylene glycol, 1,6-hexanediol, 1,8-octanediol or cyclohexane-1,4-dimethanol.

The polyesters contained in the moulding compounds of the invention are obtained by known methods from the specified components by polycondensation in the presence of catalysts.

The moulding compounds are obtained e.g. by blending in the glass fibres, and optionally the further additives, in the requisite amount before or during the polycondensation, or while working up the polyester melt, and distributing them in the polyester.

The preferred procedure is initially to granulate and dry the resultant polyester and then to blend in the glass fibres, e.g. with the aid of a single-screw extruder, while fusing the mixture. If desired, further additives can simultaneously be added wholly or partially in this blending process, and also in the preliminary steps.

The moulding compounds of the present invention are useful thermoplastic materials from which moulded articles of different kinds can be obtained by the conventional forming methods, such as casting, injection moulding or extrusion. Examples of such articles are profiles and components for technical apparatus. The moulding compounds can be readily processed in view of the melt flow properties.

Because of their good electrical properties, which have been fully described in discussing the object of the invention and its attainment, the moulding compounds of this invention are especially suitable for the production of moulded articles which are used in the electrical industry. Examples of such articles are components such as casings and switches of electrical fittings, components for electronic and electric equipment in general, and parts for automobile electric equipment.

Accordingly, the use of these moulding compounds as materials for the production of articles for utilities in the fields of electrical engineering and electronics constitutes a further object of the present invention.

The following Examples illustrate the invention in more detail.

EXAMPLE 1

A 10 liter steel reactor equipped with stirrer, separating column and temperature gauge is charged with 4005 g of dimethyl trans-1,4-cyclohexanedicarboxylate, 3600 g of 1,4-butanediol, and 2.4 g of titanium tetra-isopropylate as catalyst, and the mixture is heated to 140° C. With stirring and while introducing nitrogen, 97% of the theoretical amount of methanol is distilled off in the course of 2½ hours, whilst the temperature of the reaction mixture rises to 215° C.

The transesterification mixture so obtained is charged into a second reactor and heated to 245° C., whereupon a vacuum of about 120 mbar is applied with a water jet pump in the course of ½ hour. While slowly raising the reaction temperature to 250° C., the vacuum is increased to 0.5 mbar and then further to 0.15 mbar with a vacuum pump in the course of 45 minutes. Further condensation is carried out at constant reaction temperature for 5 hours and 15 minutes, and the reactor is then discharged. The melt in the form of a strand is cooled with a water bath and granulated.

The polyester has an intrinsic viscosity of 134 cm$^3$/g. The relative viscosity necesary for determining the intrinsic viscosity is measured in solutions of 1 g of polyester in 100 ml of a solvent consisting of equal parts of phenol and symmetrical tetrachloroethane at 30° C. The polyester contains 94 mol. % of trans-1,4- and 6 mol. % of cis-1,4-cyclohexanedicarboxylic acid units (determined by $^{13}$C-NMR spectrum).

After drying, 70% by weight of this polyester (based on the moulding compound) are reinforced with 30% by weight of glass fibres (based on the moulding compound) in a single-screw extruder at cylinder temperatures of 200° C., then cooled and granulated. The granulate is dried and then processed by injection moulding to moulded articles (standard strips, dumb-bells and boards). The cylinder temperature is 200° C., the mould temperature 80° C., and the cycle time 40 sec.

The properties of the moulded articles are reported in Table 1. The tracking resistance is measured both by the KB and KC methods of DIN 53 480, in which an electrically conductive test solution is dropped onto two electrodes which are under alternating-current voltage and are mounted on the specimen. The KB method consists in determining the maximum voltage that causes no leakage path by the 50th drop. The KC method consists in determining after how many drops (maximum 100 drops) of different voltages (maximum 600 volts) a leakage path results. The tests show that the moulded articles of the invention have a pronounced tracking resistance, combined with excellent elongation and toughness while having satisfactory tensile properties. The intrinsic viscosity of the moulded articles is 128 cm$^3$/g.

COMPARISON EXAMPLES 1-2

Products made of glass-reinforced polyethylene terephthalate (PETP) and polybutylene terephthalate (PBTP) are processed to mouldings under comparable processing conditions. The processing conditions are:

| for PBTP: | cylinder temperature | 240° C. |
|---|---|---|
|  | mould temperature | 80° C. |
|  | cycle time | 40 sec. |
| for PETP: | cylinder temperature | 275° C. |
|  | mould temperature | 140° C. |
|  | cycle time | 40 sec. |

EXAMPLES 2 AND 3

The polyester obtained in Example 1 is processed together with the glass fibres in different concentrations in accordance with the procedure described in Example 1. The intrinsic viscosities of the mouldings obtained are respectively 120 cm$^3$/g (Example 2) and 115 cm$^3$/g (Example 3).

The properties of the mouldings are reported in Table 1. The values show that the products of the invention are distinguished by high tracking resistance and by excellent elongation at break.

TABLE 1

| Example | Composition | Tracking resistance DIN 53480 KB | Tracking resistance DIN 53480 KC | Impact resistance DIN 53453 (kJ/m$^2$) | Impact strength (notched) DIN 53453 (kJ/m$^2$) | E-Module DIN 53457 (N/mm$^2$) | Tensile strength DIN 53455 (N/mm$^2$) | Elongation DIN 53455 (%) |
|---|---|---|---|---|---|---|---|---|
| 1 | 70% by wt.* of polyester obtained acc. to Ex. 1, paras. 1 & 2. 30% by wt. of glass fibres | 525 | >600 | 47 | 21 | 5500 | 90 | 6.8 |
| Comparison Example 1 | 70% by wt. of PBTP homopolyester 30% by wt. of glass fibres | 175 | 300 | 40 | 10 | 8500 | 130 | 2.5 |
| Comparison Example 2 | 70% by wt. of PETP homopolyester 30% by wt. of glass fibres | 150 | 250 | 30 | 10 | 11000 | 155 | 2.5 |
| 2 | 90% by wt. of polyester obtained acc. to Ex. 1, paras. 1 & 2 10% by wt. of glass fibres | >600 | >600 | — | — | 2700 | 55 | 7.5 |
| 3 | 60% by wt. of polyester obtained acc. to Ex. 1, paras. 1 & 2 10% by wt. of glass fibres | 525 | 600 | — | — | 6500 | 100 | 6.5 |

*The percentages by weight are based on the moulding compound

EXAMPLE 4

The procedure of Example 1 is repeated, except that decabromodiphenyl ether and Sb$_2$O$_3$ are added as flame retardants to the moulding composition. The intrinsic viscosity of the mouldings is 110 cm$^3$/g. The properties of the mouldings are reported in Table 2.

TABLE 2

| Ex. | Composition | Tracking resistance DIN 53480 KB | Tracking resistance DIN 53480 KC | Impact resistance DIN 53453 kJ/m$^2$) | Impact strength (notched) DIN 53453 (kJ/m$^2$) | E-Module DIN 53457 (N/mm$^2$) | Tensile strength DIN 53455 (N/mm$^2$) | Elongation DIN 53455 (%) | Flammability UL-94** 1.6 mm thickness of specimen |
|---|---|---|---|---|---|---|---|---|---|
| 4 | 56.5% by wt.* of polyester obtained acc. to Ex. 4 30% by wt. of glass fibres | 250 | >600 | 33 | 14 | 5200 | 81 | 4.2 | V-O |

TABLE 2-continued

| Ex. | Composition | Tracking resistance DIN 53480 KB | | Impact resistance DIN 53453 kJ/m² | Impact strength (notched) DIN 53453 (kJ/m²) | E-Module DIN 53457 (N/mm²) | Tensile strength DIN 53455 (N/mm²) | Elongation DIN 53455 (%) | Flammability UL-94** 1.6 mm thickness of specimen |
|---|---|---|---|---|---|---|---|---|---|
| | | KB | KC | | | | | | |
| | 9% by wt. of decabromodiphenyl oxide | | | | | | | | |
| | 4.5% by wt. of Sb₂O₃ | | | | | | | | |

*The percentages by weight are based on the moulding compound
**Test standard of Underwriter Laboratories

What is claimed is:

1. A moulding compound which consists essentially of
   (a) from 40 to 98% by weight, based on said moulding compound, of a polyester or copolyester which is from 90 to 100 mol % of a polyester derived from 1,4-butanediol and trans-1,4-cyclohexanedicarboxylic acid or polyester forming derivative thereof; and from 10 to 0 mol % of a polyester derived from an alkane diol of 2 to 8 carbon atoms or cyclohexane-1,4-dimethanol; and a dicarboxylic acid (or polyester forming derivative thereof) selected from the group consisting of azelaic acid, sebacic acid, succinic acid, dodecanedicarboxylic acid, cis-1,4-cyclohexanedicarboxylic acid, terephthalic acid and isophthalic acid, and
   (b) from 2 to 60% by weight, based on said moulding compound, of glass fibers.

2. A moulding compound according to claim 1 which contains 60 to 90% by weight, based on said moulding compound, of a polyester or copolyester, and 10 to 40% by weight of glass fibres, based on said moulding compound.

3. A moulding compound according to claim 1 which additionally contains one or more flame retardants in a concentration of 5 to 25% by weight, based on said moulding compound.

* * * * *